US011204902B2

(12) United States Patent
Guionneau et al.

(10) Patent No.: US 11,204,902 B2
(45) Date of Patent: Dec. 21, 2021

(54) METHOD FOR ARCHIVING USER DATA

(71) Applicant: BULL SAS, Les Clayes-sous-Bois (FR)

(72) Inventors: Christophe Guionneau, Grenoble (FR); Matthieu Isoard, Teche (FR); Xavier Plattard, Eybens (FR)

(73) Assignee: BULL SAS, Les Clayes sous-Bois (FR)

( * ) Notice: Subject to any disclaimer, the term of this patent is extended or adjusted under 35 U.S.C. 154(b) by 653 days.

(21) Appl. No.: 15/510,971

(22) PCT Filed: Sep. 15, 2015

(86) PCT No.: PCT/FR2015/052466
§ 371 (c)(1),
(2) Date: Jul. 17, 2017

(87) PCT Pub. No.: WO2016/042253
PCT Pub. Date: Mar. 24, 2016

(65) Prior Publication Data
US 2017/0316038 A1    Nov. 2, 2017

(30) Foreign Application Priority Data

Sep. 15, 2014 (FR) ...................................... 1458653

(51) Int. Cl.
*G06F 16/21* (2019.01)
*G06Q 30/06* (2012.01)
(Continued)

(52) U.S. Cl.
CPC .......... *G06F 16/219* (2019.01); *G06F 21/602* (2013.01); *G06Q 20/047* (2020.05);
(Continued)

(58) Field of Classification Search
CPC ............. G06F 17/30309; G06F 21/602; H04L 67/1097; G06Q 20/389
(Continued)

(56) References Cited

U.S. PATENT DOCUMENTS

| | | | |
|---|---|---|---|
| 8,639,625 B1 * | 1/2014 | Ginter | ..................... G06F 21/51 705/51 |
| 2011/0125598 A1 * | 5/2011 | Shin | ................... G06Q 20/3278 705/17 |

(Continued)

FOREIGN PATENT DOCUMENTS

| | | | | |
|---|---|---|---|---|
| EP | 2 634 737 A1 | 9/2013 | | |
| GB | 2506421 A | * | 4/2014 | ............... G07G 1/12 |

(Continued)

OTHER PUBLICATIONS

International Search Report as issued in International Patent Application No. PCT/FR2015/052466, dated Jan. 29, 2016.

*Primary Examiner* — Hosain T Alam
*Assistant Examiner* — Robert F May
(74) *Attorney, Agent, or Firm* — Arc IP Law, PC; Joseph J. Mayo

(57) ABSTRACT

A method for archiving data relative to a user equipped with an electronic apparatus and having a user account on a server including a database, the method including: transmitting the data relative to the user from an electronic device to the server; storing the data relative to the user in a first container of the database of the server; generating, by the server, a temporary reference associated with the first container of the database; transmitting the temporary reference from the server to the electronic apparatus; accessing the data relative to the user from the electronic apparatus, a connection between the electronic apparatus and the server having been established previously.

12 Claims, 2 Drawing Sheets

(51) Int. Cl.
*G06Q 20/04* (2012.01)
*G06F 21/60* (2013.01)
*G06Q 20/38* (2012.01)
*H04L 29/08* (2006.01)

(52) U.S. Cl.
CPC ........... G06Q 20/389 (2013.01); G06Q 30/06 (2013.01); H04L 67/1097 (2013.01)

(58) Field of Classification Search
USPC ........................................................ 707/668
See application file for complete search history.

(56) References Cited

U.S. PATENT DOCUMENTS

| 2014/0052618 | A1* | 2/2014 | Drozd .................. G06Q 20/047 705/39 |
| 2014/0122304 | A1* | 5/2014 | Racine-Kinnear ........................... G06Q 30/0643 705/27.2 |
| 2014/0229305 | A1* | 8/2014 | Elian .................... G06Q 20/047 705/17 |
| 2014/0289101 | A1* | 9/2014 | Shapiro .............. G06Q 30/0224 705/39 |
| 2014/0337175 | A1* | 11/2014 | Katzin ............... G06Q 30/0623 705/26.62 |

FOREIGN PATENT DOCUMENTS

| GB | 2506421 A | 4/2014 |
| WO | WO 01/11539 A1 | 2/2001 |
| WO | WO 2011/029957 A1 | 3/2011 |

\* cited by examiner

METHOD FOR ARCHIVING USER DATA

CROSS-REFERENCE TO RELATED APPLICATIONS

This application claims priority to International Patent Application No. PCT/FR2015/052466 filed Sep. 15, 2015, which in turn claims priority to French Patent Application No. 1458653 filed Sep. 15, 2014, the entire contents of all applications are incorporated herein by reference in their entireties.

TECHNICAL FIELD OF THE INVENTION

The technical field of the invention is that of management of user data. The invention thus relates to a method for archiving user data in a database of an online server, where the data can be accessed at any time from an electronic apparatus having Internet access.

TECHNOLOGICAL BACKGROUND OF THE INVENTION

At the till of a shop, a hotel or a restaurant, after payment is made, a client receives a document in paper form, such as for example a till ticket, an invoice or any other form of receipt. The documents can, for example, be used as proofs of purchase or guarantees, or can also be used as professional expense notes. They must therefore be retained.

However, keeping the documents poses difficulties. Documents in paper form tend to accumulate. They are also very easily lost, but even if they are not they rapidly become illegible, since they are generally printed by thermal printing, a printing technique with a very short lifetime. Another disadvantage of this printing technique is that the paper used in thermal printers contains reagents which can have environmental and health risks.

Certain shopping chains have developed systems for recording the data provided by the documents, where these systems are coupled with their customer loyalty scheme such as, for example, loyalty cards. These systems are not universal, but specific to each chain. Customer loyalty cards are also only used to accumulate points or other benefits in accordance with clients' purchases, but do not record either the details or history of the purchases.

There are also documents on which a QR code is printed containing a link to the chain's website, but this solution does not enable detailed information to be recorded either.

Similarly, payment systems through a contactless connection, such as for example the NFC of a smartphone, enable data to be transferred from the merchant to the client. These systems imply that a smartphone is used as a means of payment, and that a system which is not anonymous and which may appear insecure and intrusive is trusted.

Furthermore, none of these solutions is universal, i.e. applicable to any type of shop or service. In addition, the use of documents in paper form is still necessary, and it is impossible, of difficult, to exchange the stored data with other systems.

SUMMARY OF THE INVENTION

The method according to the invention proposes a solution to the problems described. In the invention a solution is proposed to facilitate archiving, and therefore viewing and extraction, of user data, by virtualising it: to this end, it is proposed to store the user data on an online server.

The user data includes in particular the data from transactions made by the user with a shop, whether physical or online (nature of purchases, value of purchases, date, location, etc.), and/or the dates of the user's appointments with a given service, such as a hairdresser or a doctor.

The invention therefore relates to a method for archiving data for a user equipped with an electronic apparatus, who has a user account on a server comprising a database, characterised in that the method includes the various steps consisting in:
- transmitting the user data from an electronic device to the server;
- storing the user data in a first container of the server's database;
- having the server generate a temporary reference associated with the first container of the database;
- transmitting the temporary reference from the server to the electronic apparatus;
- accessing the user data from the electronic apparatus, where a connection between the electronic apparatus and the server has been previously established.

The method according to the invention may include, in addition to the main steps mentioned in the previous paragraph, one or more characteristics from among the following ones, considered individually or in technically possible combinations:
- the step of transmitting the user data from the electronic device to the server is performed anonymously;
- the step of transmitting the temporary reference from the server to the electronic apparatus includes the various operations consisting in:
  - transmitting the temporary reference from the server to the electronic device;
  - transmitting the temporary reference from the electronic device to the electronic apparatus;
- the user data includes an identifier associated with the user;
- the step of transmission of the temporary reference is performed directly from the server to the electronic apparatus by means of the identifier associated with the user;
- the step of access to the user data includes an operation consisting in copying the user data from the first container of the database to a second container of the database dedicated to the user account;
- the second container of the database is encrypted;
- the step of access includes an operation consisting in copying the user data from the first container to a memory of the electronic apparatus;
- the method includes an additional step consisting in erasing the user data stored in the first container of the database;
- the temporary reference is a single-use reference;
- the temporary reference is automatically erased from the server after a predetermined period;
- the copying operation is activated by transmission from the electronic apparatus to the server of a query containing the temporary reference;
- transmission of the query is performed automatically on receipt of the temporary reference by the electronic apparatus.

The invention and its various applications will be better understood on reading the description which follows, and on examining the figures which accompany it.

BRIEF DESCRIPTION OF THE FIGURES

These are shown as an indication only, and are not restrictive of the invention in any way. The figures show.

For greater clarity, identical or similar elements are identified by identical reference signs in all the figures.

DETAILED DESCRIPTION OF AN IMPLEMENTATION OF THE INVENTION

One purpose of the invention is, indeed, to propose a method intended to archive user data in connection, for example, with a transaction, whether or not commercial, or the making of an appointment for a service.

Figure 1:
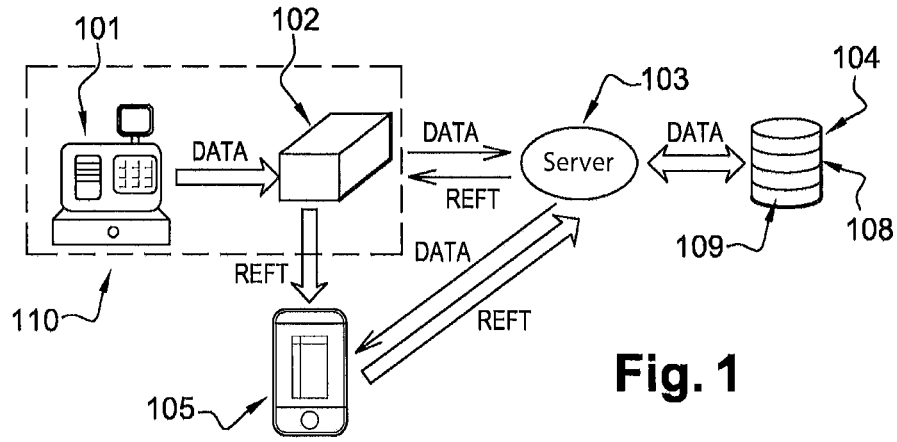
in FIG. 1, a schematic representation of a first example of a context for use of the method according to the invention.
Figure 2:
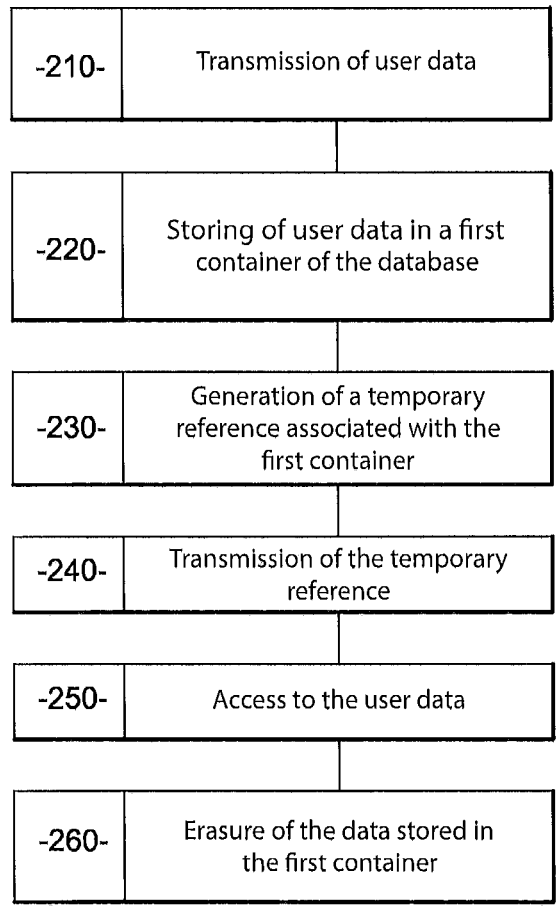
in FIG. 2, a functional diagram of an embodiment of the method according to the invention.

FIGS. 1 and 2 are described jointly.

FIG. 1 represents schematically a first example of a context for use of the method according to the invention. FIG. 1 shows an electronic device 110 including an electronic module 102 connected to a cash register 101, both being located in a store. The connection between electronic module 102 and cash register 101 is made, for example, across a USB link, an ethernet cable, a WiFi connection or any other connection means enabling data to be transmitted from cash register 101 to electronic module 102. Electronic module 102 contains a plurality of communication interfaces and protocols to adapt to the technology of cash register 101.

Electronic device 110 is also able to communicate by means of electronic module 102 with an electronic apparatus 105, for example a smartphone, belonging to a user. Furthermore, electronic device 110 is also able to communicate by means of electronic module 102 with a server 103 having a database 104. Server 103 and electronic apparatus 105 are also able to communicate with one another. Communications with server 103, from electronic device 110, and from electronic apparatus 105, are made using a secure protocol, for example based on the HTTP/HTTPS protocol.

The various operations relating to an example embodiment of the method according to the invention are, for example, as follows, illustrated in FIG. 2.

After the user has paid for their purchases, cash register 101 sends to electronic apparatus 102 data DATA relating to the transaction made by the user, for example the details of the purchases, the time and the date. These data will subsequently be referred to by the term user data DATA.

During a step 210, device 102 sends server 103 user data DATA. To accomplish transmission step 210, cash register 101 of the shop must be previously authenticated by server 103. To accomplish this, cash register 101 has an identifier and an authentication means, such as for example a password or a certificate, sent to server 103 by electronic device 102. In an advantageous embodiment, transmission 210 of user data DATA occurs anonymously, and user data DATA contains no means of identifying the user in question.

Server 103 then undertakes a step of storing 220 of the user data in a first container 108 of its database 104. Storing step 220 is followed by a step 230 during which the server generates a temporary reference REFT associated with first container 108 of database 104. The period of validity of temporary reference REFT is typically several hours to several days. During this period temporary reference REFT is stored in a memory of the server.

This is followed by a step of transmission 240 of temporary reference REFT from server 103 to electronic apparatus 105 belonging to the user. Temporary reference REFT is advantageously first sent from server 103 to electronic device 110, and temporary reference REFT is then sent from electronic device 110 to electronic apparatus 105 belonging to the user.

To accomplish transmission 240 of the temporary reference, electronic device 110 has a plurality of communication means to adapt to the technology of electronic apparatus 105. The plurality of communication means includes, for example, Bluetooth, WiFi and iBeacon communication interfaces, a contactless communication interface of the NFC type, or alternatively the display on a mini-screen of a QR code containing temporary reference REFT, or any other means of transmitting temporary reference REFT. For example, in the case of an iBeacon communication, reference REFT is written directly into the string of the UUID exchanged by the iBeacon protocol. In the case of a Bluetooth or WiFi communication reference REFT is transmitted to the telephone via a standard data exchange for these protocols.

In another embodiment, temporary reference REFT is transmitted directly, for example by email, from server 103 to electronic apparatus 105 belonging to the user. To accomplish this, an identifier associated with the user, for example their email address, must previously be transmitted, during step 210, from electronic device 110 to server 103. In this implementation transmission step 210 is no longer accomplished anonymously.

Temporary reference REFT may be a character string which is sufficiently short to be transmitted easily in each of the technologies mentioned.

An application of electronic apparatus 105 receives temporary reference REFT and deduces from it an address allowing access, during a step 250, to server 103 and to user data DATA stored in first container 108 of database 104. To access user data DATA a connection between electronic apparatus 105 and server 103 must be made. Electronic apparatus 105 has a login identifier associated with the user, and a means of authenticating the user which allows the connection to be made. The authentication means may be, for example, a password, a certificate, or a means of authentication delegated to a social identity server such as, for example, Google+, Facebook or Twitter.

The login identifier and the authentication means are registered in the application by the user when they install the application and configure it initially. The login identifier and its authentication are created by the user on server 103 when the user account is created, for example by using the application of electronic apparatus 105, or by using an Internet interface associated with server 103 on the Internet, using any Internet browser.

During step 250 of accessing user data DATA, in an advantageous embodiment, user data DATA are copied from first container 108 of database 104 to a second container 109 of database 104 dedicated to the user account. For greater security, second container 109 of database 104 dedicated to the user account may be encrypted. User data DATA may also be copied from first container 108 of database 104 to a memory of electronic apparatus 105. To activate a copying operation, electronic apparatus 105 sends server 103 a query containing temporary reference REFT.

The query may be sent automatically on receipt of temporary reference REFT by electronic apparatus 105, or alternatively in deferred fashion, for example if the connection with the server cannot be made immediately, but the wait time must not however exceed the maximum lifetime of temporary reference REFT.

Advantageously, after user data DATA have been copied into second container 109 of database 104 and/or into the memory of electronic apparatus 105, this is followed by a step of erasure 260 of user data DATA stored in first container 108 of database 104. Temporary reference REFT is then also erased. Temporary reference REFT is therefore advantageously single-use. Similarly, at the end of the lifetime of temporary reference REFT the latter is automatically erased from server 103, even if user data DATA have not been recovered. User data DATA are then no longer accessible.

Figure 3:
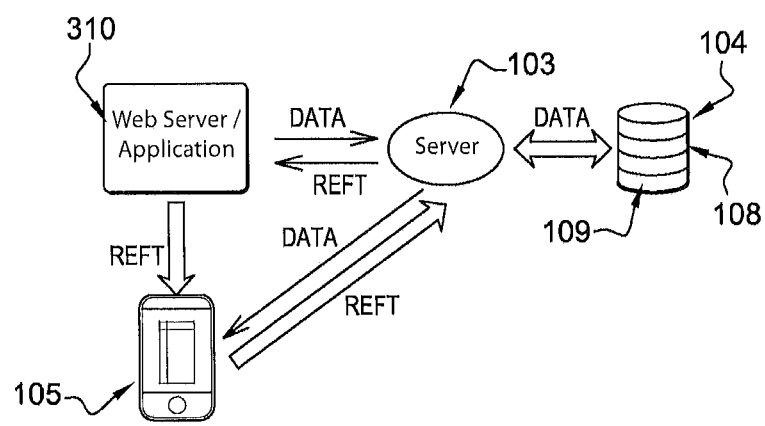
in FIG. 3, a schematic representation of a second example of a context for use of the method according to the invention.

FIG. 3 represents schematically a second example of a context for use of the method according to the invention FIG. 3 shows an electronic device 310, for example an online shopping site, the role of which is equivalent to that of cash register 101 coupled to electronic device 102 of FIG. 1. Electronic apparatus 310 is able to communicate directly with server 103, using the secure protocol, without using electronic module 102, and to transmit the temporary reference to electronic apparatus 105.

In this implementation context, transmission 240 of the temporary reference by electronic device 310 is made, for example, by sending electronic apparatus 105 an email containing the temporary reference in the form of a character string which may be captured by the application or entered manually, or in the form of a link to server 103 such as, for example, a hypertext link.

The various steps of the method according to the invention are unchanged relative to the first implementation context.

Thus, using the method according to the invention, the data are accessible at any time from the application of electronic apparatus 105 or from any electronic apparatus with an Internet connection and an Internet browser. The server 103 and its database 104 enable the user data to be saved and accessed for a very long period, typically several years.

What is claimed is:

1. A method for archiving user data of a user equipped with an electronic apparatus and having a user account on a server comprising a database comprising a plurality of container databases, the method comprising:
transmitting, following a financial transaction between the user and a point-of-sale electronic device, the user data from the point-of-sale electronic device to the server;
storing the user data in a first container database of the database of the server, wherein the user data is stored in association with the user account on the server and wherein the user data includes data describing the financial transaction between the user and the point-of-sale electronic device;
having the server generate a temporary reference associated with the first container database of the database;
transmitting the temporary reference from the server to the point-of-sale electronic device and then from the point-of-sale electronic device to the electronic apparatus or transmitting the temporary reference directly from the server to the electronic apparatus;
after establishing a connection between the electronic apparatus and the server, accessing the user data stored in the first container database from the electronic apparatus using the temporary reference on the electronic apparatus, wherein the accessing the user data includes copying the user data from the first container database of the database to a second container database of the database of the server dedicated to the user account and erasing the user data stored in the first container database.

2. The method according to claim 1, the transmitting the user data from the point-of-sale electronic device to the server is performed anonymously.

3. The method according to claim 1, wherein the user data includes an identifier associated with the user.

4. The method according to claim 1, wherein the second container database of the database is encrypted.

5. The method according to claim 1, wherein the accessing further includes copying the user data from the first container database to a memory of the electronic apparatus.

6. The method according to claim 1, wherein the temporary reference is a single-use reference.

7. The method according to claim 1, wherein the temporary reference is automatically erased from the server after a predetermined period.

8. A method for archiving user data of a user equipped with an electronic apparatus and having a user account on a server comprising a database comprising a plurality of container databases, the user data being generated at a point-of-sale system, the method comprising:
generating the user data at the point-of-sale system, the user data being generated in connection with a sale transaction made by the user at the point-of-sale system;
transmitting, following a financial transaction between the user and a point-of-sale electronic device, the user data from the point-of-sale electronic device to the server;
storing the user data in a first container database of the database of the server, wherein the user data is stored in association with the user account on the server and wherein the user data includes data describing the financial transaction between the user and the point-of-sale electronic device;
having the server generate a temporary reference associated with the first container database of the database, the server generating the temporary reference after receiving the user data from the point-of-sale electronic device;
transmitting the temporary reference from the server to the point-of-sale electronic device and then from the point-of-sale electronic device to the electronic apparatus or transmitting the temporary reference directly from the server to the electronic apparatus;
after establishing a connection between the electronic apparatus and the server, accessing the user data stored in the first container database from the electronic apparatus using the temporary reference on the electronic apparatus, wherein the accessing the user data includes copying the user data from the first container database of the database to a second container database of the database of the server dedicated to the user account and erasing the user data stored in the first container database.

9. The method according to claim 8, wherein the transmitting the user data from the point-of-sale electronic device to the server is performed anonymously.

10. The method according to claim 8, wherein the user data includes an identifier associated with the user.

11. The method according to claim 8, wherein the second container database of the database is encrypted.

12. The method according to claim 8, wherein the accessing further includes copying the user data from the first container database to a memory of the electronic apparatus.

* * * * *